United States Patent [19]

Shureb

[11] Patent Number: 5,450,784
[45] Date of Patent: Sep. 19, 1995

[54] ELECTROPLATED PISTON SKIRT FOR IMPROVED SCUFF RESISTANCE

[75] Inventor: Robert F. Shureb, Farmington Hills, Mich.

[73] Assignee: Detroit Diesel Corporation, Detroit, Mich.

[21] Appl. No.: 128,352

[22] Filed: Sep. 28, 1993

[51] Int. Cl.⁶ ................................................. F16J 1/04
[52] U.S. Cl. .................................. 92/223; 123/193.6
[58] Field of Search .................. 92/222, 223, 224; 123/193.6

[56] References Cited

U.S. PATENT DOCUMENTS

| | | | |
|---|---|---|---|
| T102,501 | 12/1982 | Croft | 204/96 |
| 1,856,272 | 5/1932 | Summers | 92/223 |
| 2,162,830 | 6/1939 | Summers | 92/223 |
| 2,817,562 | 12/1957 | Felming et al. | |
| 3,004,336 | 10/1961 | Timuska | |
| 3,295,198 | 1/1967 | Coan | |
| 3,358,349 | 12/1967 | Rosen | |
| 3,360,446 | 12/1967 | Jongkind | |
| 3,405,610 | 10/1968 | Hill et al. | |
| 3,522,155 | 7/1970 | Dow | |
| 3,622,470 | 11/1971 | Gowmann | 204/33 |
| 3,658,488 | 4/1972 | Brown et al. | 29/195 |
| 3,663,384 | 5/1972 | Lescure | 204/43 |
| 3,881,999 | 5/1975 | Toth et al. | 204/33 |
| 3,891,287 | 6/1975 | Vogt | |
| 3,896,009 | 7/1975 | Kobayashi et al. | |
| 3,915,667 | 10/1975 | Ricks | 204/33 X |
| 4,018,949 | 4/1977 | Donakowski et al. | 123/193.6 X |
| 4,111,772 | 9/1978 | Horn | 204/180 P |
| 4,162,205 | 7/1979 | Wilson et al. | 204/43 S |
| 4,252,618 | 2/1981 | Grenda | 204/43 S |
| 4,297,976 | 11/1981 | Bruni et al. | |
| 4,309,064 | 1/1982 | Fukuoka et al. | |
| 4,329,207 | 5/1982 | Maruta | 204/54 L |
| 4,466,399 | 8/1984 | Hinz et al. | |
| 4,470,184 | 9/1984 | Fukuoka et al. | |
| 4,664,021 | 5/1987 | Ruddy | |
| 4,941,397 | 7/1990 | Kawai et al. | |
| 4,955,353 | 9/1990 | Amataka et al. | |
| 4,957,212 | 9/1990 | Duck et al. | |
| 5,050,547 | 9/1991 | Takahashi | |
| 5,063,894 | 11/1991 | Meilke et al. | 92/222 X |
| 5,080,056 | 1/1992 | Kramer et al. | |
| 5,094,150 | 3/1992 | Russner et al. | |
| 5,115,770 | 5/1992 | Yen et al. | |
| 5,129,378 | 7/1992 | Donahue et al. | |
| 5,131,356 | 7/1992 | Sick et al. | |
| 5,158,052 | 10/1992 | Yoshimura | |
| 5,294,554 | 3/1994 | Uchida et al. | 436/73 |
| 5,314,717 | 5/1994 | Alt | 92/223 X |

FOREIGN PATENT DOCUMENTS 380783 9/1932 United Kingdom .................. 92/223
1200453 7/1970 United Kingdom .

OTHER PUBLICATIONS

Tin-Plate Replacement Pistons, Motor, Aug. 1934, pp. 112–114.

Primary Examiner—John E. Ryznic
Attorney, Agent, or Firm—Brooks & Kushman

[57] ABSTRACT

A piston assembly is disclosed for use in an engine, which comprises a piston body including a crown, a skirt extending from the crown, and a pair of gudgeon pin bosses connected to the skirt. The skirt defines an exterior surface of the piston body and a tin-containing electrodeposited plating extends at least partially over the exterior surface of the skirt and a gudgeon pin/piston interface for added wear resistance.

11 Claims, 1 Drawing Sheet

ELECTROPLATED PISTON SKIRT FOR IMPROVED SCUFF RESISTANCE

TECHNICAL FIELD

The present invention relates to an electrodeposited layer of a tin-containing electrodeposited plating upon a piston for internal combustion engines, the layer imbuing the characteristics of improved scuff and seizure resistance to the piston.

BACKGROUND ART

Due to its superior strength, cast iron, particularly in a pearlitic malleable form, has become an accepted material for pistons in heavy-duty internal combustion engines. However, iron pistons running in iron cylinder bores require protective coatings which provide resistance to wear, seizure, and corrosion, even in the lowest power density engines. In such engines, iron phosphate coatings have been used. To provide greater protection, tin plating has replaced iron phosphate as the iron piston coating of choice, particularly in higher power density engines. As the demand for increased power density continues, even greater protection is required to prevent skirt scuffing, galling, and seizing.

Skirt scuffing is characterized by a loss of tin plating from the skirt and burnt or galled iron evidenced on the skirt and the cylinder bore liner. In general, scuffing begins on the thrust face of the piston. Failures tend to occur at high fuel rates, during run-in. However, problems with skirt scuffing generally are not manifest in those engines which develop low power.

A variety of solutions have been undertaken to address such problems. Some processes call for the spraying of coatings directly onto the iron or onto a protective tin plating. This approach generally reduces productivity, adds cost, and may introduce new problems which may have been solved by the tin plating. Another approach has been to supplement the tin plating with a greater thickness. Such an approach, however, incurs added cost, diminishes productivity, and increases piston-to-bore clearance as the tin plating wears away during the useful life of the piston.

U.K. Patent No. 1 200 453, which was published on Jul. 20, 1970 discloses a high performance diesel engine having cast iron or steel pistons which are coated with an aluminum alloy, the coating being finished to the final required contour of the skirt. The coating is applied as a spray deposit by oxy-acetylene or a plasma-arc spray gun before a subsequent machining step, although the coating may be applied by other methods, such as by casting or plating.

The assignee of the present invention has used a tin babbitt alloy material in its manufacture of remanufactured pistons by flame-spraying a tin babbitt material in wire form over piston skirts. The tin babbitt has a composition of 3.5% copper, 7.5% antimony, with the balance being tin and some trace impurities, including lead, up to about 0.25%. Additionally, the assignee of the present invention practices a process of tin plating piston skirts, in which potassium stannate is used as a coating ingredient. Use of this ingredient is also disclosed in U.S. Pat. No. 4,018,949, which issued on Apr. 19, 1977. That reference discloses a tin deposition applied to a selected zone of an aluminum piston skirt. A warm stream of an aqueous solution containing a protective methyl agent is sprayed onto a selected zone of the piston.

These, among other approaches to the art of providing a wear-resistant coating to piston skirts leave unsolved the question of how to provide an improved coating of iron pistons of internal combustion engines so that they may be better protected against scuffing, galling and seizing at selected zones thereof with high productivity and reliability at a low cost. What is needed is a method of protecting the skirt of a piston against a variety of wear problems when such piston is operated in an engine housing constructed primarily of iron. Such methods should protect selected zones of the piston which are subjected both to wear and a severely corrosive atmosphere. Ideally, the desired method should provide such protection at a reduced cost in comparison to other methods, at equivalent production rates, with existing or similar plating process equipment. Moreover, such pistons should have a limited quantity of a protective coating applied uniformly over such wear surfaces as an outer diameter of the piston skirt (extending from its uppermost to its lowermost region), and at a gudgeon pin/piston interface.

SUMMARY OF THE INVENTION

The present invention discloses an electroplated piston skirt and which is alloyed for increased toughness, hardness and strength at operating temperatures, while maintaining the superior bearing characteristics of pure tin. Such characteristics include compatibility with iron (anti-welding and anti-scoring characteristics), wettability (affinity for lubricants), conformability (ability to yield to and compensate for misaligned operation), embeddability (ability to trap and hold foreign materials and thus prevent them from scoring and wearing bearing surfaces), and corrosion resistance (ability to withstand chemical attack by uninhibited or contaminated lubricating oils). The disclosed alloys provide increased load carrying capacity at operating temperatures without introducing new failure modes.

The protective alloy tin plating is derived, preferably, from an aqueous solution of potassium stannate for easy implementation with existing tin tanks. However, preferred alloying elements with tin, including copper and antimony, may require acidic solutions or the addition of cyanide.

The present invention calls for the use of the following chemical compositions:

| Alloy No. | Cu | Sb | Sn |
| --- | --- | --- | --- |
| 1 | 2% | 0–8% | Bal. |
| 2 | 4% | 0–8% | Bal. |
| 3 | 6% | 0–8% | Bal. |
| 4 | 8% | 0–8% | Bal. |

BEST MODES FOR CARRYING OUT THE INVENTION

Figure 1:
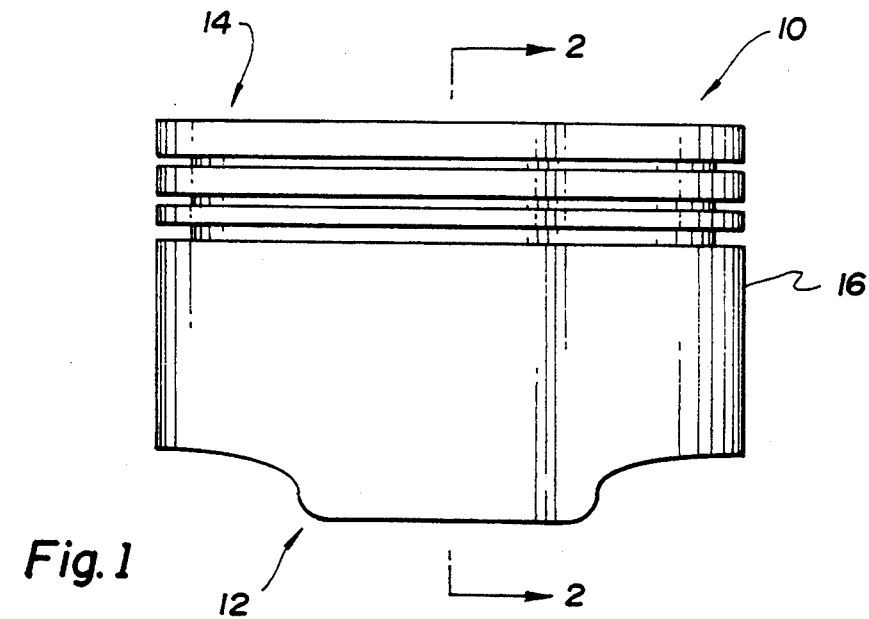
FIG. 1 is a side elevation view of a piston formed according to the present invention.
Figure 2:
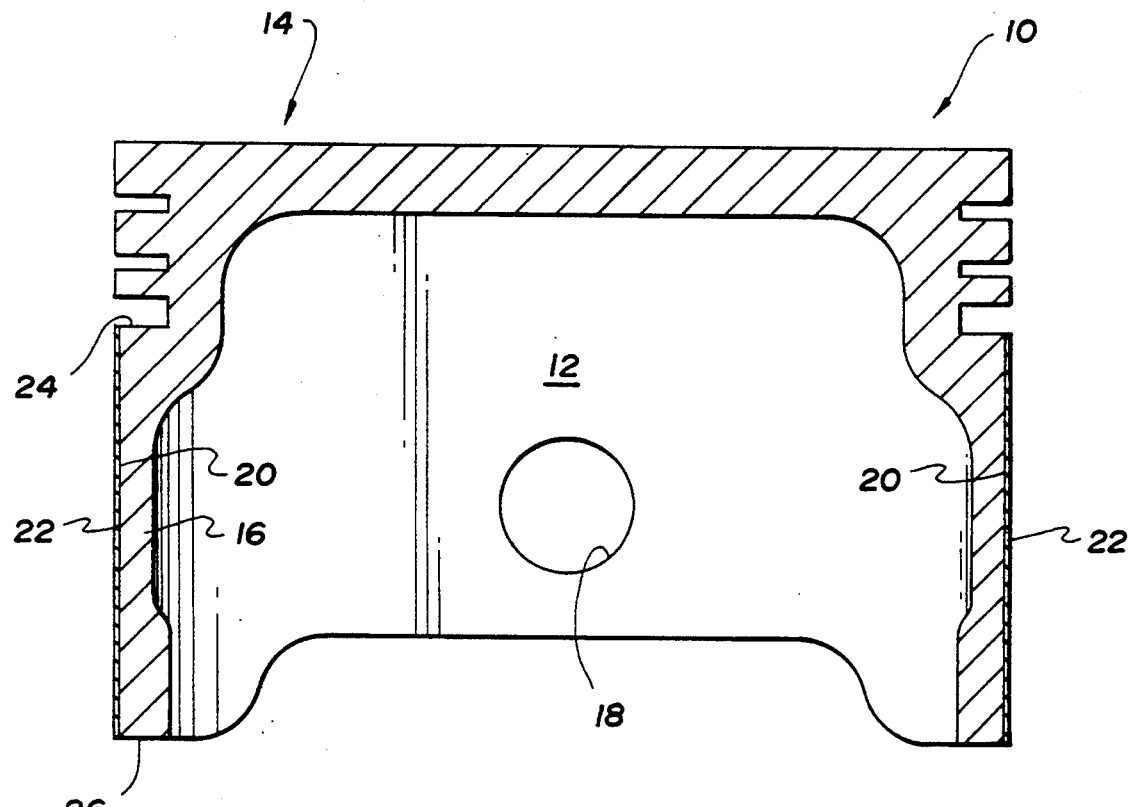
FIG. 2 is an axial sectional view of the invention disclosed in FIG. 1 taken along the line 2—2 thereof.

The present invention, as depicted in FIGS. 1-2, includes a piston assembly 10 for use in an engine. The piston assembly comprises a piston body 12 including a crown 14, a skirt 16 extending from the crown, and a pair of gudgeon pin bosses 18 connected to the skirt. The skirt 16 defines an exterior surface 20 of the piston body. A tin-containing plating 22 at least partially covers the exterior surface of the skirt for added wear resistance.

The present invention also discloses an electroplating process of tin which is alloyed for increased toughness, hardness and strength at operating temperatures, while maintaining the superior bearing characteristics of pure tin. Such characteristics include compatibility with iron (anti-welding and anti-scoring characteristics), wettability (affinity for lubricants), conformability (ability to yield to and compensate for inherent misaligned operation), embeddability (ability to trap and hold foreign materials and thus prevent them from scoring and wearing bearing surfaces), and corrosion resistance (the ability to withstand chemical attack by uninhibited or contaminated lubricating oils). The disclosed alloys provide increased load carrying capacity at operating temperatures without introducing new failure modes.

The protective tin alloy plating is derived, preferably, from an aqueous solution of potassium stannate for easy implementation with existing tin tanks. However, preferred alloying elements, including copper and antimony, require acidic solutions.

The present invention calls for the use of the following chemical compositions:

| Alloy No. | Cu | Sb | Sn |
| --- | --- | --- | --- |
| 1 | 2% | 0–8% | Bal. |
| 2 | 4% | 0–8% | Bal. |
| 3 | 6% | 0–8% | Bal. |
| 4 | 8% | 0–8% | Bal. |

The high lead and tin alloys discovered by Isaac Babbitt in 1839 are commonly known as babbitts. They offer an attractive combination of compatibility, conformability, and embeddability for use as bearing surfaces. Even under severe operating conditions, i.e. high loads, fatigue, or high temperature, babbitts may be used as a thin surface coating because of their good rubbing characteristics. The present invention discloses the use of tin base babbitts for electrodeposition on piston skirts.

Such babbitts usually consist of a relatively soft, solid solution matrix of antimony and tin, in which are disposed small hard particles of the intermetallic copper compound with tin ($Cu_6Sn_5$).

In a conventional electrochemical cell, electroplating occurs at a cathode, where metal builds up. This process is known as electroplating. Protective coatings can provide a barrier between a metal and its environment. Tin, as an example of a noble metal, can form a protective coating on steel as long as there is no break in the coating.

To obtain a continuous coating, the whole surface of the basis (piston skirt) must be made the cathode, a current being supplied from an external source.

Before applying a metallic coat, it is essential to start with the surface free from grease and appreciable oxide. In electroplating, an invisible oxide-film often present on the metal is reduced as soon as it enters a plating bath.

The preferred mode of practicing the present invention calls for the following operative steps.

Operation

A. Before plating:
1. The tin plating solution should be circulating and overflowing the weir plate at end of tank.
2. The tin plating temperature should be 170°–180° F. and the electroclean temperature should be 140°–150° F.
3. The three electroclean rinse tanks and the three tin plating rinse tanks should be overflowing.
4. There should be enough stock to run at least one hour.

B. During the plating operation:
5. Make sure the four (4) contacts on each carrier are tight and the rubber boots fit correctly over the top of the piston skirt.
6. Make sure all electrical cables are tightly secured.
7. Check the tin thickness of two (2) of every twelve (12) piston skirts.
8. Do not adjust the plating current until at least 20 piston skirts have come out of the bath.
9. If thickness is low on several carriers in a row, increase amps approximately 200 amps per ten thousandth inch of desired increase in tin thickness. If the thickness is high on several carriers, decrease amps using same criterion.
10. If the bath is going to be shut down for more than thirty (30) minutes, the carriers should be loaded with dummies.
11. Check the solution levels and temperatures in the electroclean, plating and rinse tanks at least three (3) times per shift.
12. If a carrier should consistently produce low tin on pistons, mark that carrier and replace it.

| Equipment and Materials | |
| --- | --- |
| Tin Plating Machine | DE 33610 |
| General Electra Thickness Gage | Type 9091 |
| Potassium Stannate | 45S85 |
| Potassium Hydroxide | 3S51 |
| Hydrogen Peroxide | 45S8 |
| Electroclean Soap | 45S87 |
| Permascope | T.N. 97129 |
| Master Gage | T.N. 76066 |

As noted above, the first part of the bath recipe is potassium stannate in a concentration of 180 grams/liter. This yields a tin concentration of 70 grams/liter. The function of the potassium stannate is to provide the tin source in the bath. The next part of the recipe is potassium hydroxide in a concentration of 40 grams/liter. This is the carrier of the potassium stannate solution in the bath.

Copper in a 0.5 grams/liter concentration is added. The copper is kept in solution, preferably by a chelating process.

Copper cyanide, and potassium cyanide may be used to put copper alloy into the tin for the finished product. Parts have been prepared at 5–25% copper. Tin-copper alloy plated skirts with various levels of copper have been prepared using the cyanide approach.

A graph of current-vs-voltage would show a steady rise in current as voltage is increased, before a steep change in slope. In normal production, voltage is reduced once a higher current is achieved for efficient plating (about 55 ASF current density).

Typically, 180° F. is the standard bath temperature. Plating time is 45 minutes for a production part. PH in the bath is about 11–12.

Atotech K-Sol A liquid or its equivalent is added to the bath to refurbish the tin to the proper valence of 5 plus 4. K-Sol A is a liquid form of potassium stannate which is used to maintain the tin concentration in alkaline tin plating solutions. This chemical can be used whether either soluble or insoluble anodes are employed. Its composition is as follows:

| | |
|---|---|
| Tin | 18–18.75% |
| Potassium Stannate | 47.5% minimum free KOH less than 1.0% Total KOH less than 18% |

Ideally, the area covered by the electrodeposited layer includes the whole outside diameter of the piston skirt, including the wrist pin bore, but excluding the ring grooves, and for trunk-type pistons, the dome (crown) of the piston.

Potassium stannate has a pH of 10 in solution with the proper valence which is the SN plus 4. As the piston is electroplated, the tin in solution goes to plus 2 valence. There is a need to refurbish it back to plus 4 to get it to plate.

Ideally, the layer of tin plate has a thickness between 0.0007 to 0.0023 inches to enhance wear resistance.

What is claimed is:

1. A piston assembly for use in an engine, comprising:
   a piston body including
   a crown;
   a skirt extending from the crown; and
   a pair of gudgeon pin bosses connected to the skirt, the skirt defining an exterior surface of the piston body; and
   an electrodeposited plating extending at least partially over the exterior surface of the skirt for added wear resistance, wherein the plating is formed from a tin Babbitt alloy.

2. The piston assembly of claim 1 wherein the thickness of the electrodeposited plating is between 0.0007–0.0023 inches to enhance wear resistance.

3. The piston assembly of claim 1 prepared according to a method comprising the steps of:
   providing a cathode comprising the exterior surface of the piston skirt;
   supplying a current from an external source;
   placing an anode in proximity thereto;
   providing a solution into which the anode and cathode are placed, the solution including potassium stannate to provide a tin source to the solution and potassium hydroxide.

4. The piston assembly of claim 3 wherein the copper is kept in solution by a chelating step.

5. The piston assembly of claim 1 wherein the electrodeposited plating comprises 2–8% Cu; 0–8% Sb; bal. Sn.

6. A piston assembly for use in an engine, comprising:
   a piston body including
   a crown;
   a skirt extending from the crown; and
   a pair of gudgeon pin bosses connected to the skirt, the skirt defining an exterior surface of the piston body; and
   an electrodeposited plating extending at least partially over the exterior surface of the skirt for added wear resistance, wherein the piston body is formed from a ferrous material and the electrodeposited plating is formed from a tin Babbitt alloy.

7. A piston assembly for use in an engine, comprising:
   a piston body including
   a crown;
   a skirt extending from the crown; and
   a pair of gudgeon pin bosses connected to the skirt, the bosses defining a gudgeon pin/piston interface therewithin,
   the skirt defining an exterior surface of the piston body; and
   an electrodeposited plating for added wear resistance, and to the gudgeon pin/piston interface, the electrodeposited plating providing greater toughness, hardness and strength at operating temperatures than tin, while providing compatibility with iron, wettability, conformability, embeddability, and corrosion resistance, wherein the electrodeposited plating comprises 2% Cu; 0–8% Sb; bal. Sn.

8. A piston assembly for use in an engine, comprising:
   a piston body including
   a crown;
   a skirt extending from the crown; and
   a pair of gudgeon pin bosses connected to the skirt, the bosses defining a gudgeon pin/piston interface therewithin,
   the skirt defining an exterior surface of the piston body; and
   an electrodeposited plating for added wear resistance, and to the gudgeon pin/piston interface, the electrodeposited plating providing greater toughness, hardness and strength at operating temperatures than tin, while providing compatibility with iron, wettability, conformability, embeddability, and corrosion resistance, wherein the electrodeposited plating comprises 4% Cu; 0–8% Sb; bal. Sn.

9. A piston assembly for use in an engine, comprising:
   a piston body including
   a crown;
   a skirt extending from the crown; and
   a pair of gudgeon pin bosses connected to the skirt, the bosses defining a gudgeon pin/piston interface therewithin,
   the skirt defining an exterior surface of the piston body; and
   an electrodeposited plating for added wear resistance, and to the gudgeon pin/piston interface, the electrodeposited plating providing greater toughness, hardness and strength at operating temperatures than tin, while providing compatibility with iron, wettability, conformability, embeddability, and corrosion resistance, wherein the electrodeposited plating comprises 6% Cu; 0–8% Sb; bal. Sn.

10. A piston assembly for use in an engine, comprising:
    a piston body including
    a crown;
    a skirt extending from the crown; and
    a pair of gudgeon pin bosses connected to the skirt, the bosses defining a gudgeon pin/piston interface therewithin,
    the skirt defining an exterior surface of the piston body; and an electrodeposited plating for added wear resistance, and to the gudgeon pin/piston interface, the electrodeposited plating providing greater toughness, hardness and strength at operating temperatures than tin, while providing compatibility with iron, wettability, conformability, embeddability, and corrosion resistance, wherein the electrodeposited plating comprises 8% Cu; 0–8% Sb; bal. Sn.

11. A piston assembly for use in an engine, comprising:

a piston body including a crown;

a skirt extending from the crown; and a pair of gudgeon pin bosses connected to the skirt, the skirt defining an exterior surface of the piston body; and a tin-based electrodeposited plating extending at least partially over the exterior surface of the skirt for added wear resistance, wherein the electrodeposited plating comprises a soft, solid solution matrix of antimony and tin in which are disposed small, hard particles of an intermetallic copper compound with tin ($Cu_6 Sn_5$).

* * * * *